United States Patent
White (10) Patent No.: US 8,516,739 B2
(45) Date of Patent: Aug. 27, 2013

(54) APPARATUS AND METHOD FOR AUTOMATICALLY JIGGING A FISHING LINE

(76) Inventor: Travis White, Zimmerman, MN (US)

( * ) Notice: Subject to any disclaimer, the term of this patent is extended or adjusted under 35 U.S.C. 154(b) by 320 days.

(21) Appl. No.: 13/066,742

(22) Filed: Apr. 23, 2011

(65) Prior Publication Data

US 2012/0266516 A1    Oct. 25, 2012

(51) Int. Cl.
*A01K 91/06* (2006.01)
(52) U.S. Cl.
USPC .............................................. 43/19.2; 43/4.5
(58) Field of Classification Search
USPC ................................ 43/4.5, 19.2, 21.2
See application file for complete search history.

(56) References Cited

U.S. PATENT DOCUMENTS

| | | | |
|---|---|---|---|
| 2,663,962 A | 12/1953 | King | |
| 2,732,649 A | 1/1956 | Tuttle | |
| 2,934,849 A | 5/1960 | Kampa | |
| 2,976,640 A | 3/1961 | Sensenbrenner | |
| 3,394,484 A | 7/1968 | Sonoski | |
| 3,599,369 A | 8/1971 | Carlson | |
| 4,280,295 A | 7/1981 | Hoeving | |
| 4,312,147 A | 1/1982 | Christiansen | |
| 4,420,900 A | 12/1983 | Nestor | |
| 4,642,930 A | 2/1987 | Graf | |
| 4,821,448 A * | 4/1989 | Lindaberry | 43/19.2 |
| 4,951,411 A * | 8/1990 | Ecker | 43/19.2 |
| 5,036,616 A * | 8/1991 | Wilsey | 43/26.1 |
| 5,231,784 A | 8/1993 | Condusta | |
| 5,535,538 A | 7/1996 | Heuke | |
| 5,540,010 A * | 7/1996 | Aragona | 43/19.2 |
| 5,996,268 A | 12/1999 | Buczkowski | |
| 6,009,656 A * | 1/2000 | Knepp | 43/26.1 |
| 6,021,596 A | 2/2000 | Heuke | |
| 6,220,538 B1 | 4/2001 | Durso | |
| 6,363,650 B1 | 4/2002 | Beeler | |
| 6,401,380 B1 * | 6/2002 | McGonigal, Jr. | 43/19.2 |
| 6,588,137 B1 | 7/2003 | Rozkowski | |
| 6,722,078 B1 | 4/2004 | Kelley | |
| 6,817,136 B2 | 11/2004 | Novak | |
| 6,920,714 B1 | 7/2005 | Modglin | |
| 7,062,877 B1 | 6/2006 | Koch, III | |
| 7,845,106 B2 * | 12/2010 | Norman | 43/21.2 |
| 2001/0049899 A1 * | 12/2001 | Keller | 43/19.2 |
| 2006/0248778 A1 * | 11/2006 | Ward et al. | 43/19.2 |
| 2007/0181729 A1 | 8/2007 | Schuster | |

* cited by examiner

*Primary Examiner* — Darren W Ark
*Assistant Examiner* — Marc Burgess
(74) *Attorney, Agent, or Firm* — Karen White (57) ABSTRACT

An improved automatic jigging device comprising a motorized wheel having cutouts of a multitude of geometric shapes, sizes, and textures, a support arm with a fulcrum, and a jigging arm with a clamp for holding a fishing line. The fulcrum is inserted into the cutout and the rotational movement of the wheel transfers the movement to the fulcrum. The movement of the fulcrum is transferred to the clamp through the support arm and the jigging arm. The clamp holding the fishing line transfers the irregular, life-like movement to the fishing line. Throughout the fishing experience, the type of irregular, life-like movement of the fishing line may be changed by inserting the fulcrum into a cutout with a different geometric shape, size, and texture.

7 Claims, 10 Drawing Sheets

APPARATUS AND METHOD FOR AUTOMATICALLY JIGGING A FISHING LINE

BACKGROUND

Prior Art

The following is a tabulation of some prior art that presently appears relevant:

U.S. Pat. Nos.

| Patent Number | Kind Code | Issue Date | Patentee |
|---|---|---|---|
| 2,663,962 | | Dec. 29, 1953 | King |
| 2,934,849 | | May 03, 1960 | Kampa |
| 2,976,640 | | Mar. 28, 1961 | Sensenbrenner |
| 3,394,484 | | Jul. 30, 1968 | Sonoski |
| 3,599,369 | | Aug. 17, 1971 | Carlson |
| 4,280,295 | | Jul. 28, 1981 | Hoeving, et al. |
| 4,312,147 | | Jan. 26, 1982 | Christiansen |
| 4,420,900 | | Dec. 20, 1983 | Nestor |
| 4,642,930 | | Feb. 17, 1987 | Graf |
| 5,231,784 | | Aug. 03, 1993 | Condusta |
| 5,535,538 | | Jul. 16, 1996 | Heuke |
| 6,021,596 | | Feb. 08, 2000 | Heuke |
| 6,220,538 | B1 | Apr. 24, 2001 | Durso |
| 6,363,650 | B1 | Apr. 02, 2002 | Beeler |
| 6,588,137 | B1 | Jul. 08, 2003 | Rozkowski |
| 6,722,078 | B1 | Apr. 20, 2004 | Kelley et al. |
| 6,817,136 | B2 | Nov. 16, 2004 | Novak |
| 6,920,714 | B1 | Jul. 26, 2005 | Modglin |
| 7,062,877 | B1 | Jun. 20, 2006 | Koch, III |

Jigging a fishing line results in the lure or bait moving in a manner, normally an up and down movement, which is more attractive to fish than stationary bait. Effecting the movement to the lure or bait increases the likelihood that fish will strike the lure or bait. This jigging motion is even more important in ice fishing where cold temperatures result in the fish being lethargic and slow. In the colder temperatures, fish need a higher level of enticement, such as the jigging motion, to strike the fish. In ice fishing, the jigging motion is directly translated to the lure or bait because the line is vertical through the ice fishing hole.

Manual jigging can be boring and tedious and difficult for elderly, young and disabled people. Ice fishing allows more than one line to be used, but an individual can only manually jig one line at a time, leaving the other lines stationary. There is a need for devices that will jig a line automatically. Numerous motorized mechanical devices have been made to effect movement automatically. Prior art reflects many approaches and attempts.

Multiple wind driven devices have been developed that use wind and mechanical means to impart movement to the fishing line. Also, many motorized mechanical devices, either attached to a fishing rod or as standalone units with rod and jigging device all as one unit, have been developed.

Most of the prior art jigging devices effect an up and down movement or are one dimensional. The most life-like motion is one that is multidimensional. Multidimensional and irregular movements increase the attractiveness of the lure or bait to the fish.

A few devices that effect a multi-dimensional or irregular motion have been proposed—for example U.S. Pat. No. 6,920,714 to Modglin (2005) device allows for an intensity control that allows the jigging movement to be controlled. U.S. Pat. No. 5,535,538 to Heuke (1996) device uses interchangeable arms to impart different jigging movements. U.S. Pat. No. 4,420,900 to Nestor (1983) device uses a flexible control arm which enables the device to be set to impart a different amount of jigging to the fishing line. U.S. Pat. No. 5,231,784 to Condusta (1993) wind-driven device motion causes the hook to rise and fall and move horizontally in the water to attract a fish. U.S. Pat. No. 6,588,137 to Rozkowski (2003)—in a preferred embodiment, 3 jigging rates are provided.

All devices for automatically jigging a fishing line heretofore known suffer from a number of disadvantages:

1. Most of today's ice fishing is done in stationary or portable ice fishing houses that have walls for blocking the wind. The wind-driven devices would be inoperable in these houses.
2. Many of the devices utilize complex, complicated, expensive, and cumbersome components and designs and are expensive to manufacture and difficult to transport to the fishing site.
3. Many of the devices interfere with the operation of the fishing rod or fishing line.
4. Most ice fishing is done with standalone reels that are not attached to a rod. The prior art devices that attach to a rod to operate would not work with these standalone reels.
5. Many of the prior art devices are difficult to install when you want an automatic jigging motion and difficult to uninstall when you don't want an automatic jigging motion.
6. Many of the prior art devices utilize delicate and fragile arms, which add to the gear that needs to be carried to the fishing site and which are susceptible to damage potentially causing the device to be inoperable.

The prior art devices have many disadvantages such as, relying on the wind to operate, interfering with the operation of the fishing device, effecting only an up and down movement to the lure or bait, are complex and cumbersome, expensive to manufacture, and utilize fragile parts that are susceptible to damage. There is still a need for a device that improves upon the prior art by offering the following features:

1. automatically effects a jigging motion to the lure or bait through motorized mechanical means so that it may operate in an ice fishing house
2. will work with standalone reels
3. can impart multiple different movements to the lure or bait to attract different species of fish
4. can be unattached to the line and not used when an automatic jigging motion is not desired
5. where the line is released from the jigging device when the fish takes the lure or bait so that the reeling of the fish is not interfered
6. a robust design that is not likely to be damaged and is less expensive to manufacture.

SUMMARY

In accordance with one embodiment an automatic jigging device comprises a motorized wheel, a support arm with a fulcrum, and a jigging arm with a clamp for holding a fishing line.

ADVANTAGES

Accordingly several advantages of one or more aspects are as follows: to provide multiple, life-like, irregular jigging motions, to be operable when there is no wind, to be robust and not easily damaged, to be manufactured more easily, to be disengaged from the line to allow normal operation of the reel and to not interfere with reeling in a fish, to be mountable to a solid surface, to provide a reel that can be positioned in multiple ways to provide flexibility in location of the fishing line from the stationary base, to alert the user when a fish has struck the lure or bait. Other advantages of one or more aspects will be apparent from a consideration of the drawings and ensuing description.

DRAWINGS

Figures

DRAWINGS

| Reference Numerals | |
|---|---|
| 22 A, B, C, D | screw |
| 24 | plate |
| 26 | ball joint |
| 28 | bolt |
| 30 | knob |
| 32 | rattle reel arm |
| 34 | rattle reel |
| 36 | fishing line |
| 38 | rattle reel track |
| 40 | foundation arm |
| 42 | pivot joint |
| 44 | housing |
| 46 A, B, C | jigging motion wheel |
| 48 | support arm |
| 50 | jigging arm |
| 52 | axis joint |
| 54 | foundation arm track |
| 56 | power source |
| 58 | motor |
| 60 | switch |
| 62 | dial |
| 64 | hinge joint |
| 66 | fulcrum |
| 68 | clamp |
| 70 | microswitch |
| 72 | clamp screw |

DETAILED DESCRIPTION

Figure 1:
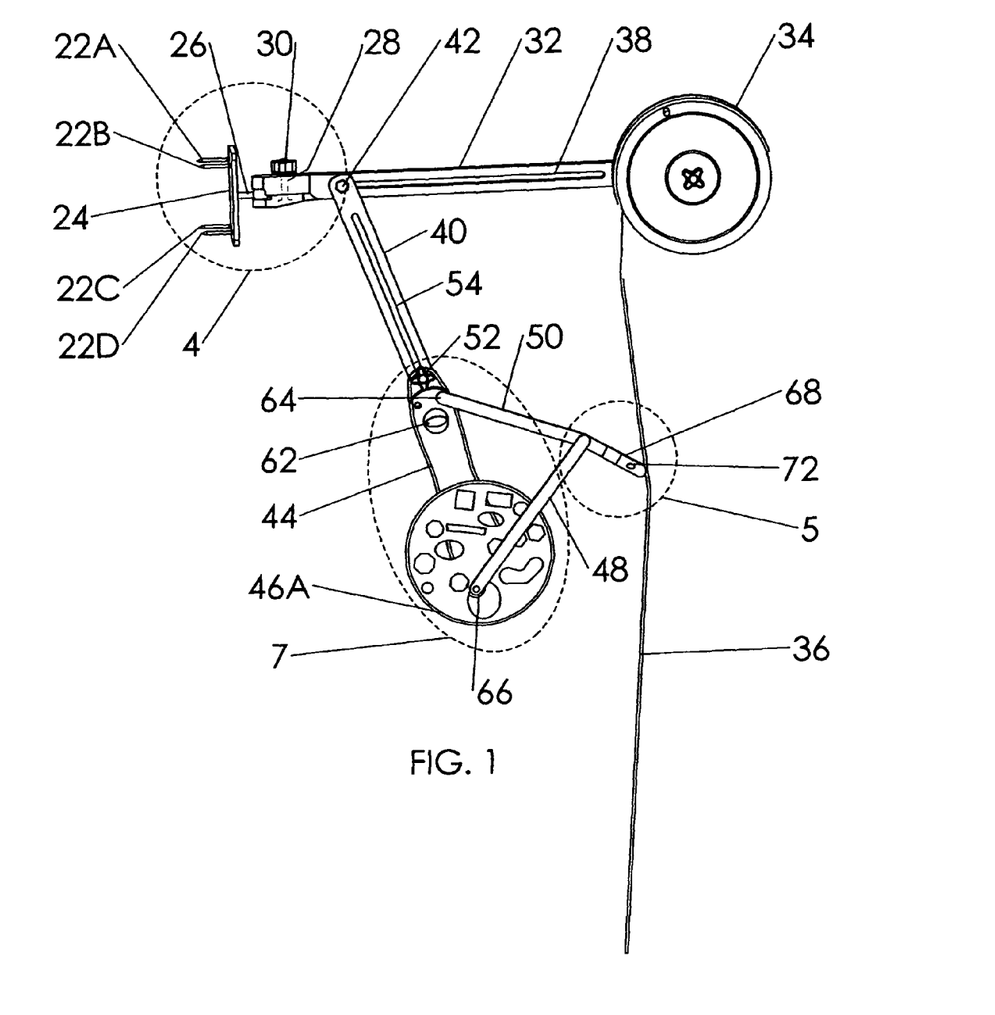
FIG. 1 shows a full front side view of a first embodiment of the automatic jigging device assembled and set.
Figure 2:
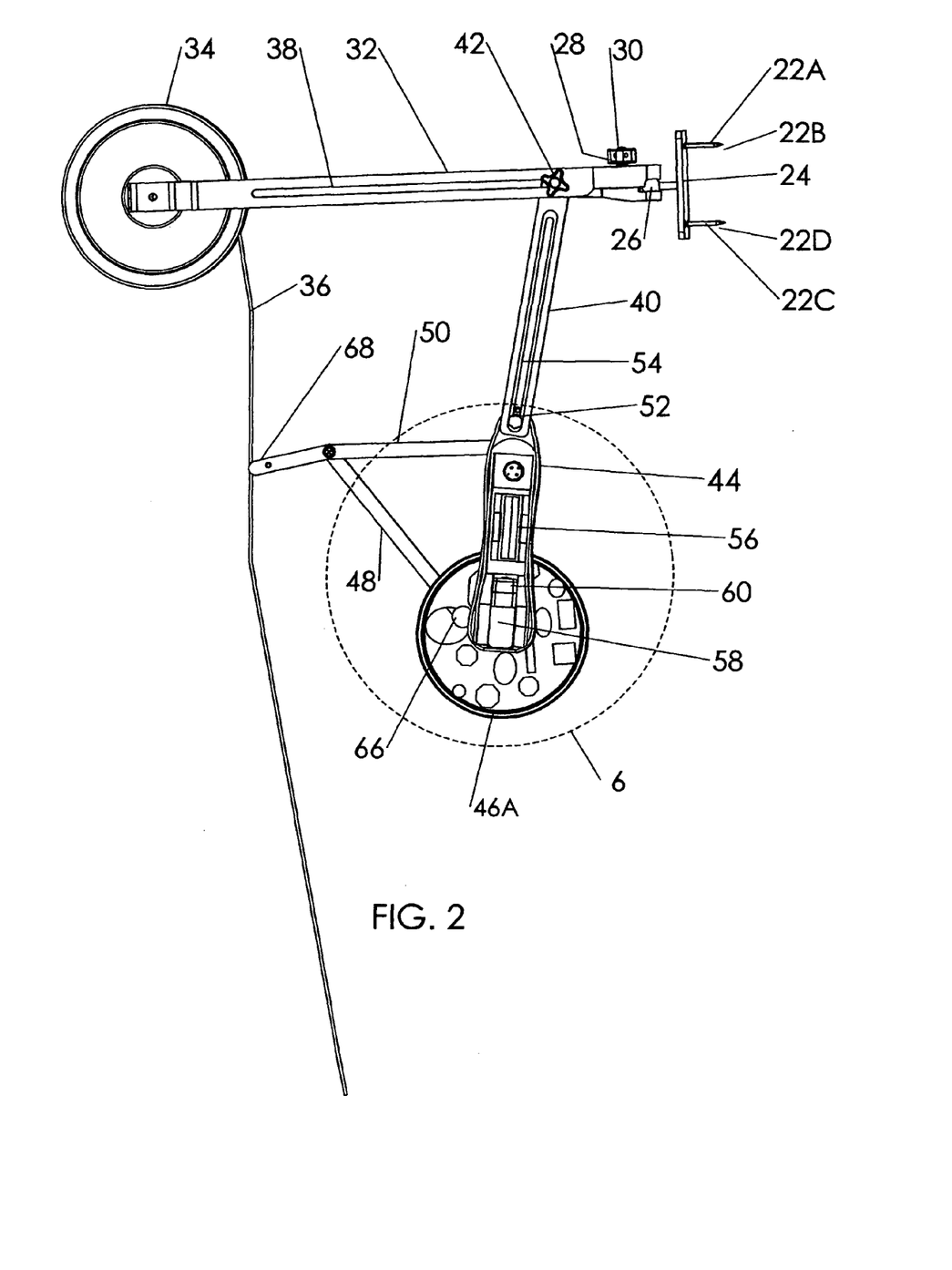
FIG. 2 shows a full back side view of a first embodiment of the automatic jigging device assembled and set.

One embodiment of the automatic jigging device is illustrated in FIG. 1 and FIG. 2. The automatic jigging device has a method for being attached to a wall or other stationary base. FIG. 1 and FIG. 2 show the first embodiment of this attachment utilizing four screws 22 A, B, C, D and a plate 24. The automatic jigging device may be rotated in three dimensions about the attachment by a ball joint 26 that can be secured by the tightening of a bolt 28 by a knob 30. A rattle reel arm 32 connects a rattle reel 34 to the ball joint 26 and wall attachment. The rattle reel 34 contains a spool of fishing line 36 wrapped around the rattle reel 34. Rattle reel 34 rotates about its center axis when the fishing line 36 is pulled. As the rattle reel 34 rotates, beads or bells make noise to alert that the fishing line 36 is being pulled.

The rattle reel arm 32 contains a rattle reel track 38. Extending from the rattle reel arm 32 is a foundation arm 40. The foundation arm 40 is attached to the rattle reel arm 32 by an axis or pivot joint 42 that is held within the rattle reel track 38. The pivot joint 42 can be moved along, forward and backward, the rattle reel track 38. This movement may adjust the positioning of the automatic jigging device with respect to the stationary base and the rattle reel 34. The pivot joint 42 may be tightened and secured in one position by a clamping mechanism.

The other end of the foundation arm 40 is attached by an axis joint 52 to a housing 44 that holds a jigging motion wheel 46A and a support arm 48 and a jigging arm 50. The axis joint 52 may be tightened and secured in one position by a clamping mechanism. Housing 44 can move rotationally about axis joint 52. Housing 44 can also move up and down along a foundation arm track 54. The housing 44 contains electronic components and a power source 56 that operate the automatic jigging device. One embodiment of the automatic jigging device utilizes a dial 62 to control the electronic components.

A hinge joint 64 connects the jigging arm 50 to the housing 44. The jigging arm 50 is attached to the support arm 48. The jigging motion wheel 46A is attached to the housing 44 and electronic components. The jigging motion wheel 46A rotates about its center axis and contains cutouts of various geometric shapes and sizes. One end of the support arm 48 contains a fulcrum 66 which transfers the movement of the jigging motion wheel 46A to the support arm 48. The other end of the support arm 48 is attached to the jigging arm 50 at about the mid-point of the jigging arm 50. One end of the jigging arm 50 is attached to a clamp 68. The clamp 68 clasps the fishing line 36 and effects the movement of the jigging arm 50 to the fishing line 36.

Figure 3:
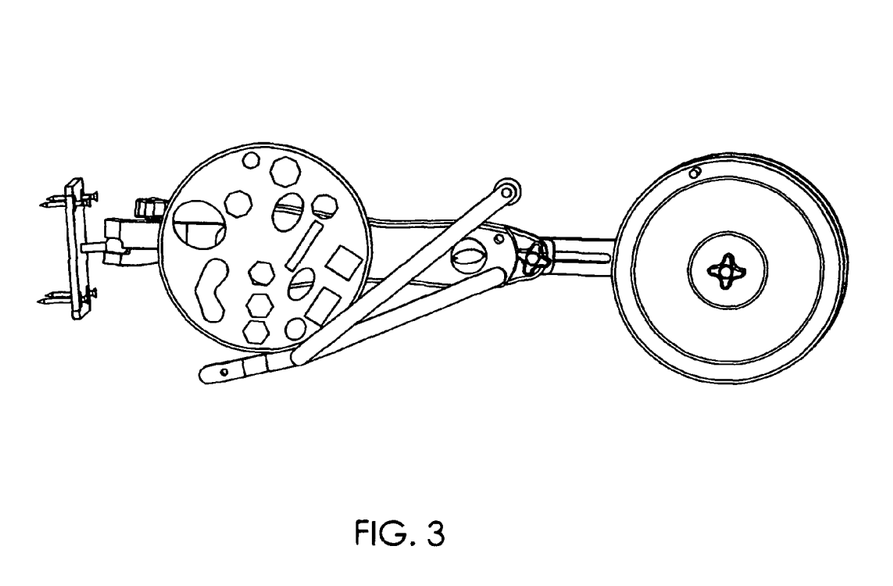
FIG. 3 shows a side view of the automatic jigging device collapsed down for storage and transportation.

FIG. 3 shows a full side view of the automatic jigging device in a collapsed state for storage or transportation. The foundation arm 40 and the housing 44 are substantially parallel to the rattle reel arm 32.

Figure 4:
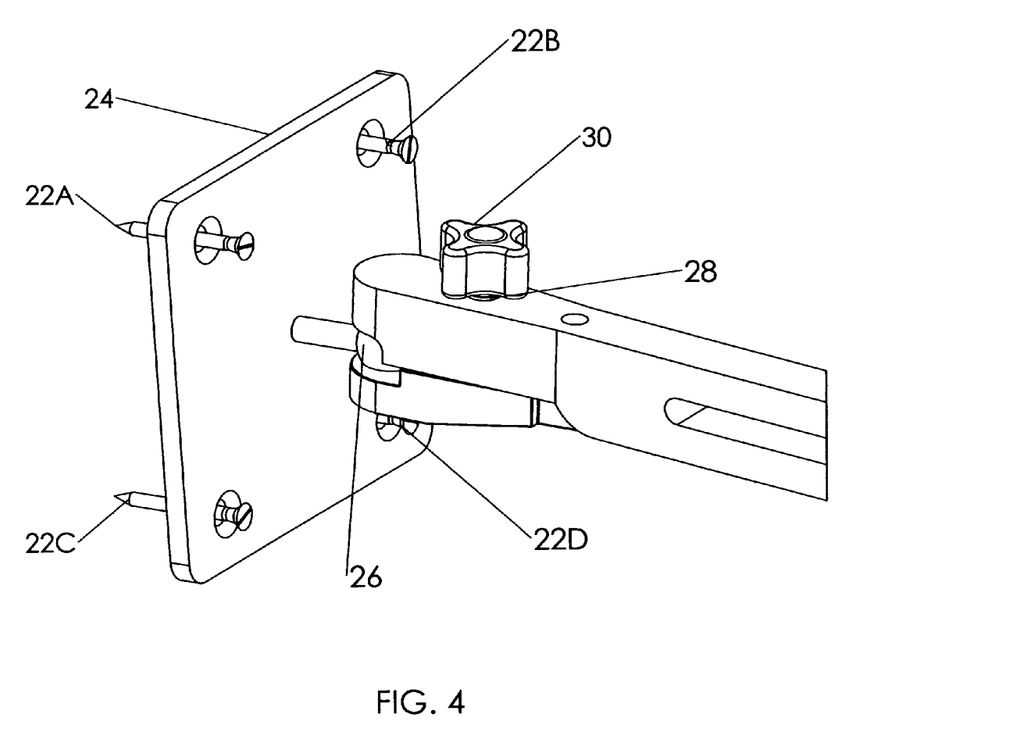
FIG. 4 shows an exploded view in detail of the portion indicated in FIG. 1.

FIG. 4 shows an exploded view of one embodiment of the attachment mechanism including the screws 22 A, B, C, D, the plate 24, the ball joint 26, the bolt 28 and the knob 30 for tightening the bolt 28.

Figure 5:
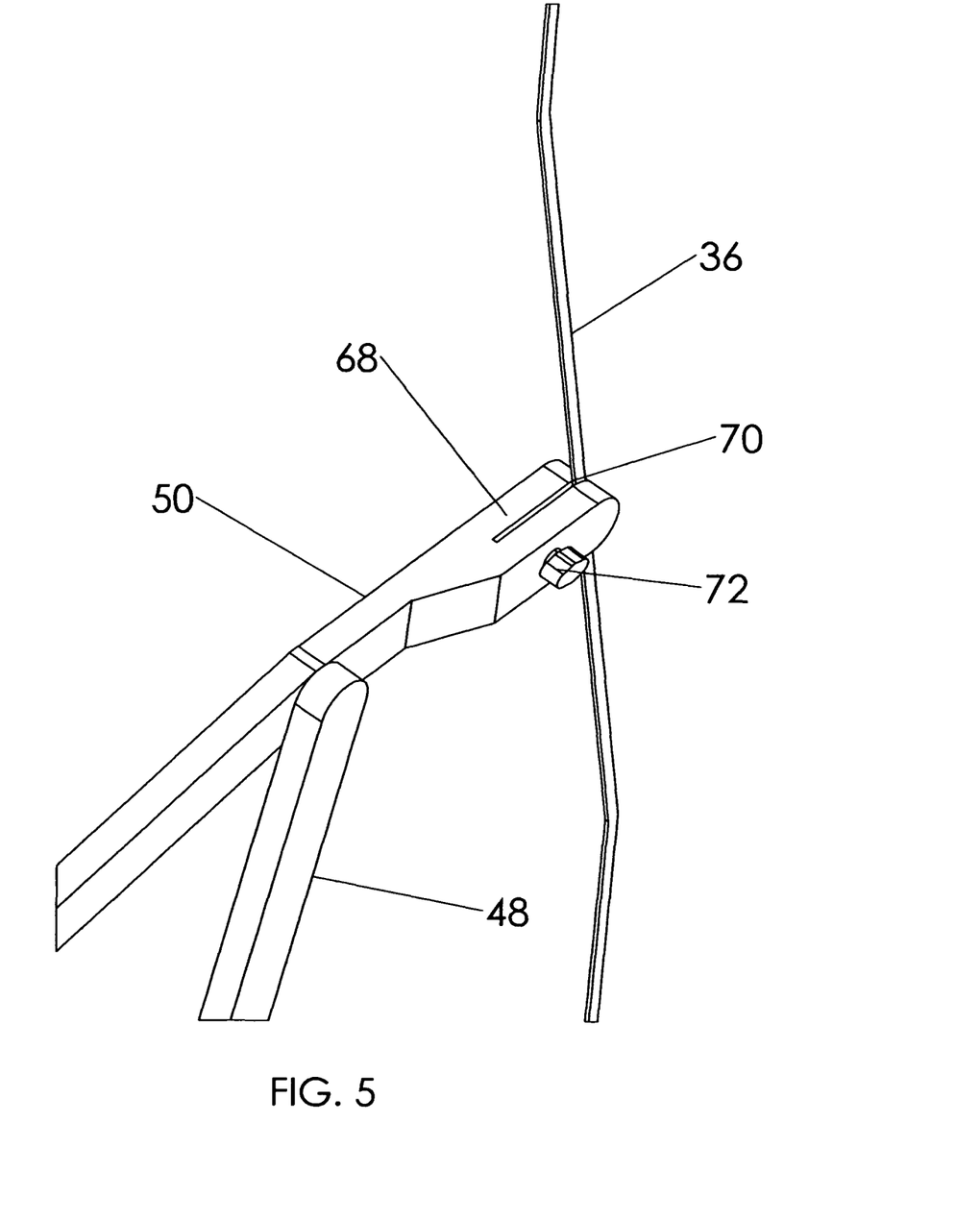
FIG. 5 shows an exploded view in detail of the portion indicated in FIG. 1.

FIG. 5 shows an exploded view of the clamp 68 and fishing line 36. The clamp 68 has a microswitch 70 and a tightening clamp screw 72. The tightening clamp screw 72 is utilized to manually control the pressure utilized to clasp the fishing line 36. The microswitch 70 is utilized to shut off the power source 56 that powers the motor 58 that mechanically rotates the jigging motion wheel 46A.

Figure 6:
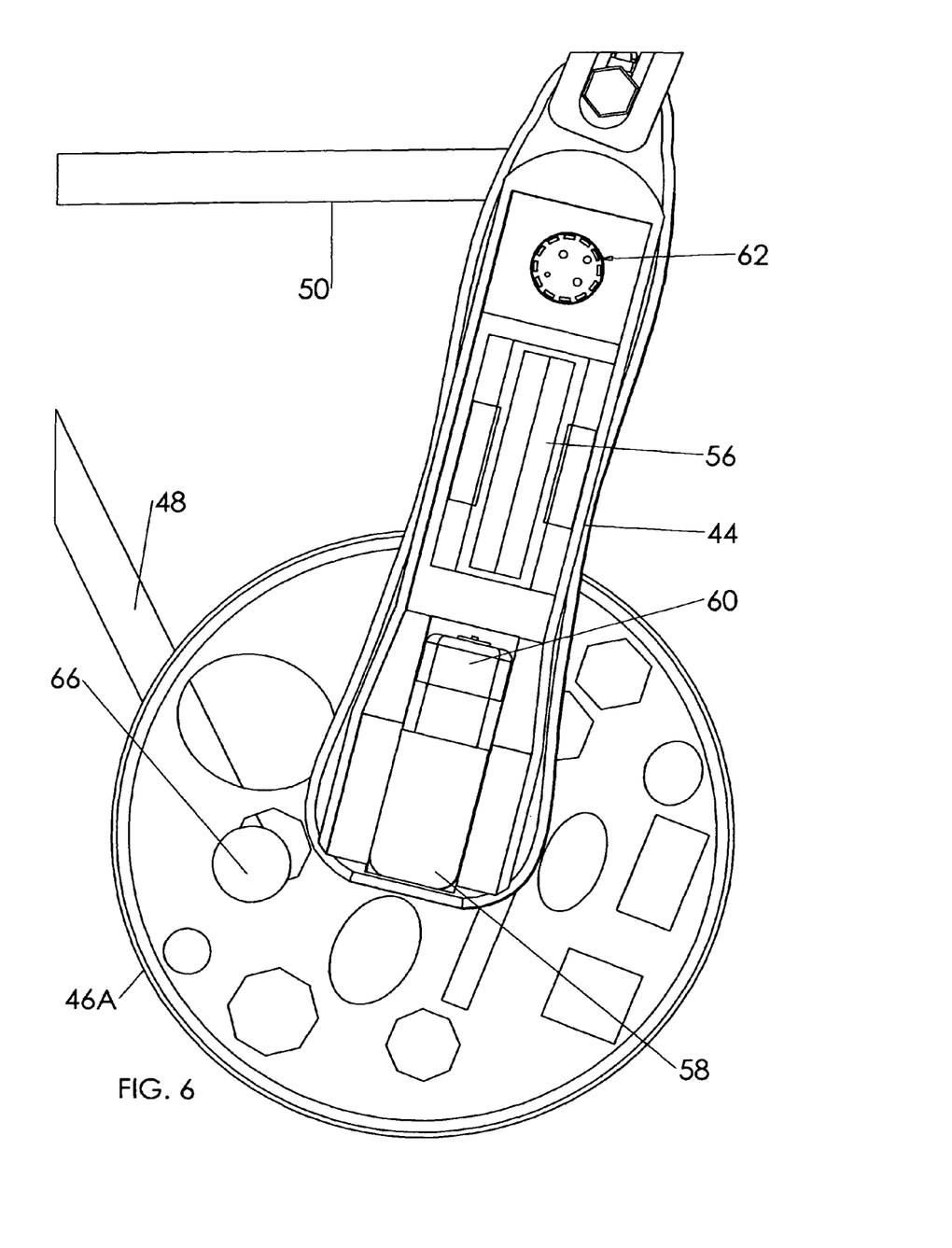
FIG. 6 shows an exploded view in detail of the portion indicated in FIG. 2.

FIG. 6 shows an exploded view of the housing 44 and the electronic components. A power source 56 is used to power a motor 58. The motor 58 mechanically rotates the jigging motion wheel 46A. A switch 60 controls the amperage to the motor 58 which controls the speed at which the jigging motion wheel 46A mechanically rotates. The dial 62 controls the switch 60. The electronic components and configuration may be designed and provided in a variety of ways that maintain a similar function.

Figure 7:
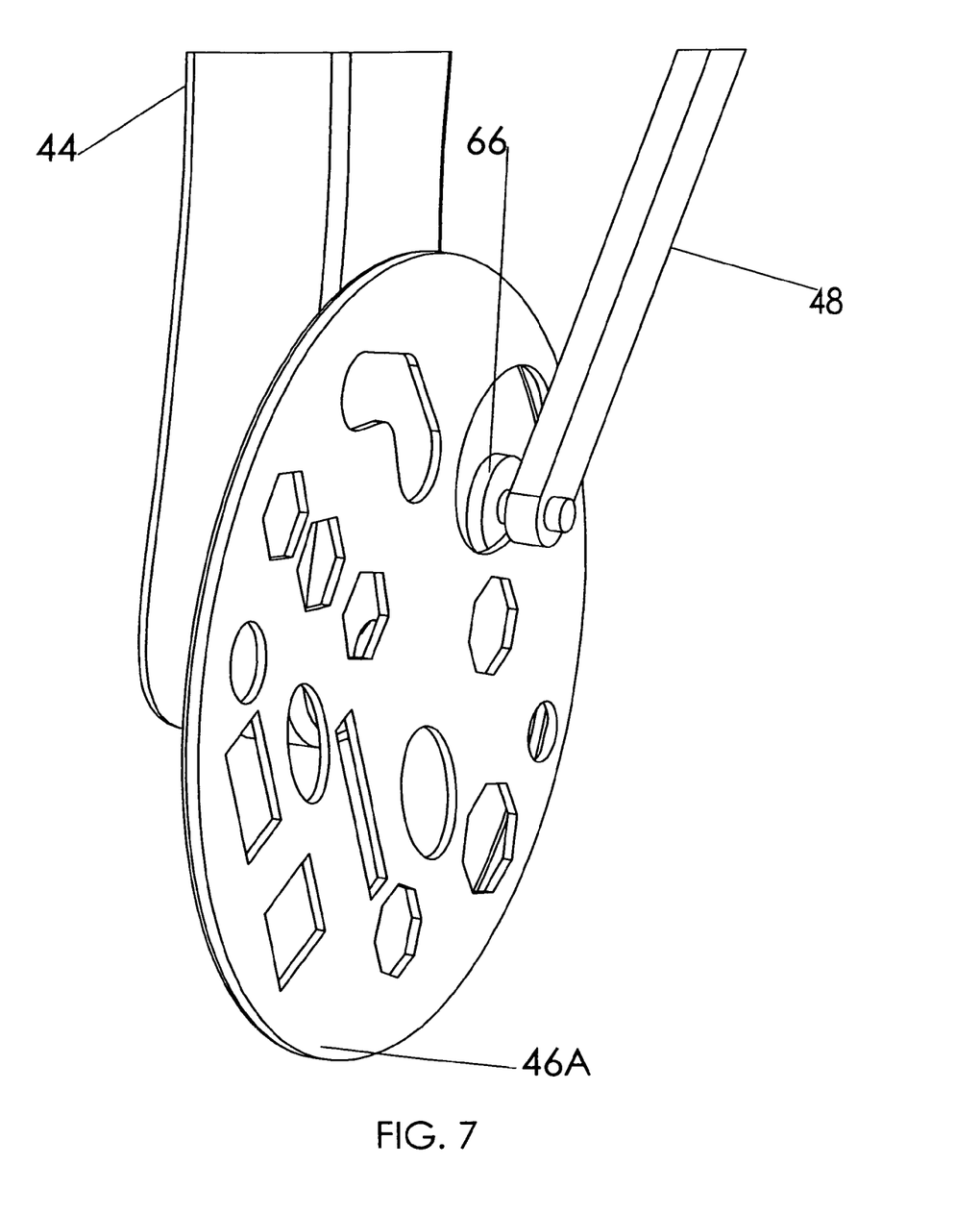
FIG. 7 shows an exploded view in detail of the portion indicated in FIG. 1.

FIG. 7 shows an exploded view of the jigging motion wheel 46A and the fulcrum 66. The fulcrum 66 is placed inside one of the cutouts of various geometric shapes and sizes. The fulcrum 66 transfers the movement of the jigging motion wheel 46A to the support arm 48 which transfers the movement to the jigging arm 50.

Figure 8:
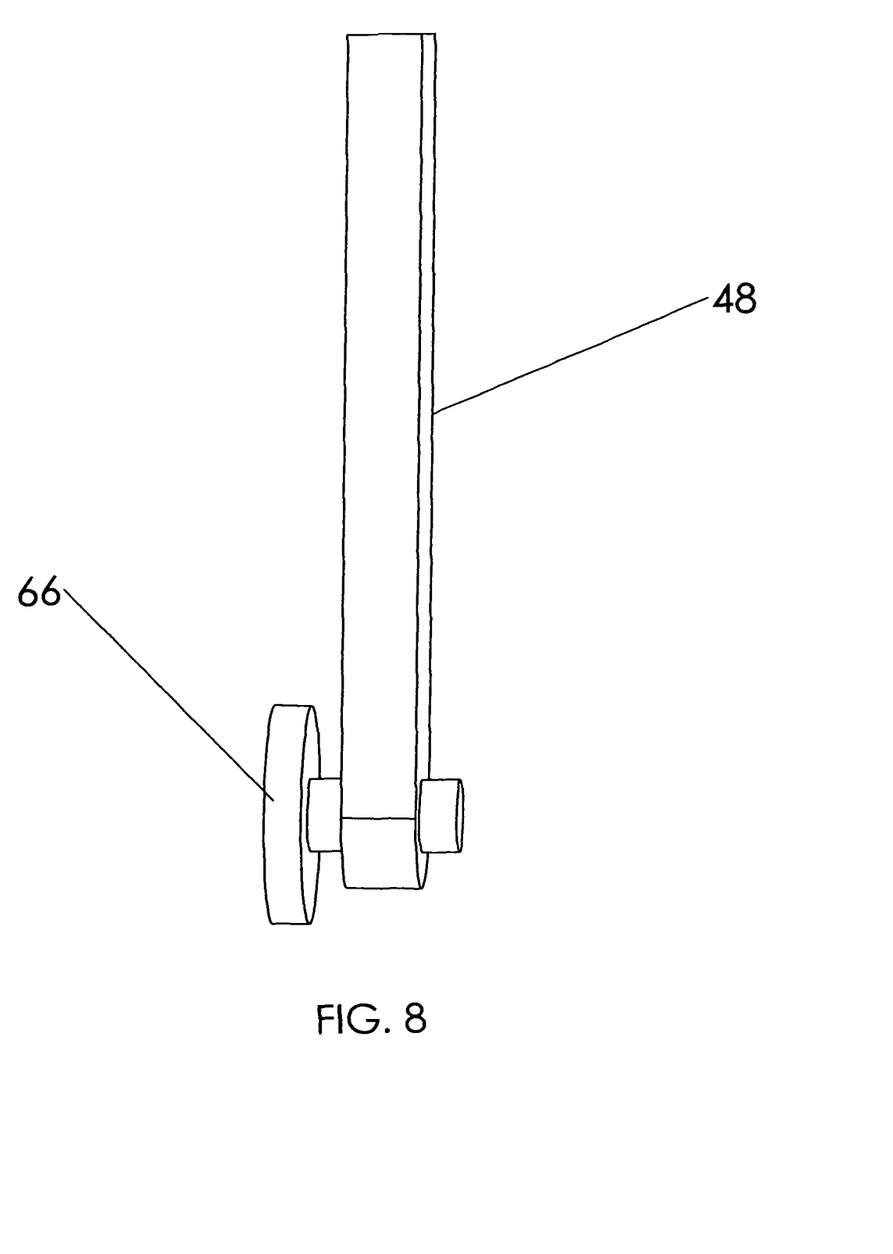
FIG. 8 shows a view of the fulcrum.

FIG. 8 shows a view of the fulcrum 66. The fulcrum 66 contains two different diameter circles, one larger and one smaller. The smaller circle is utilized to lock the fulcrum 66 into the cutout geometric shape.

Figure 9:
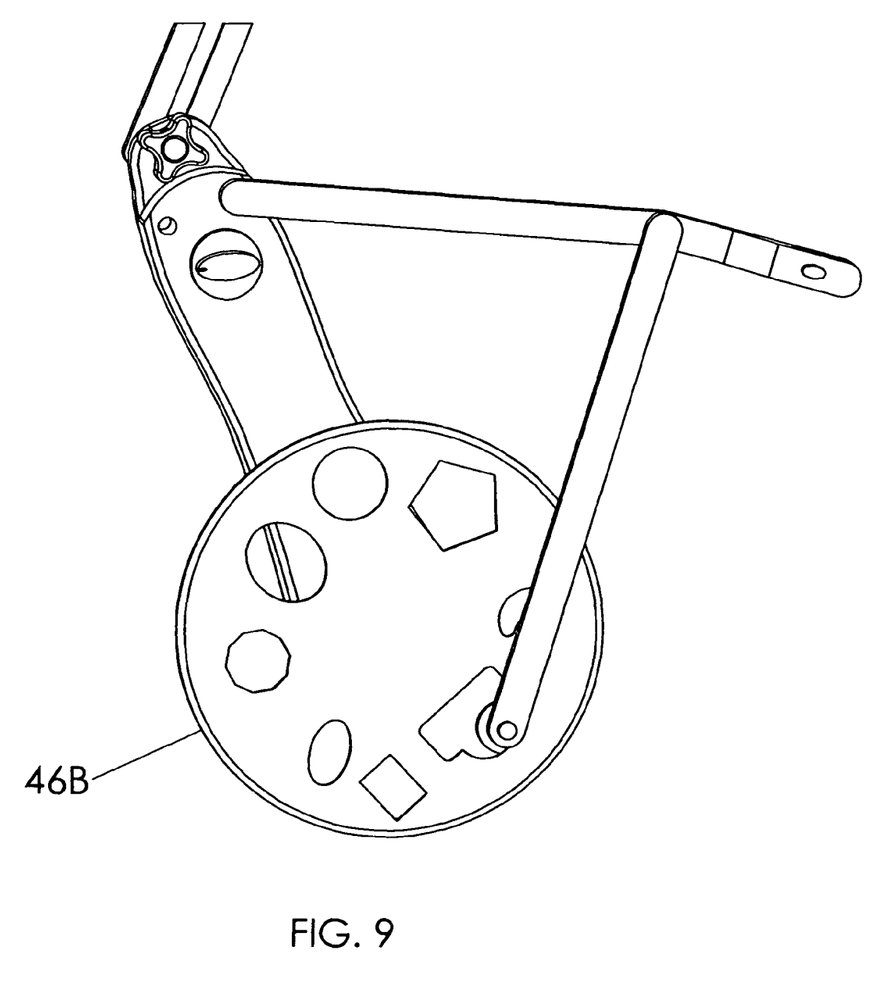
FIG. 9 shows one embodiment of the jigging motion wheel in side view.
Figure 10:
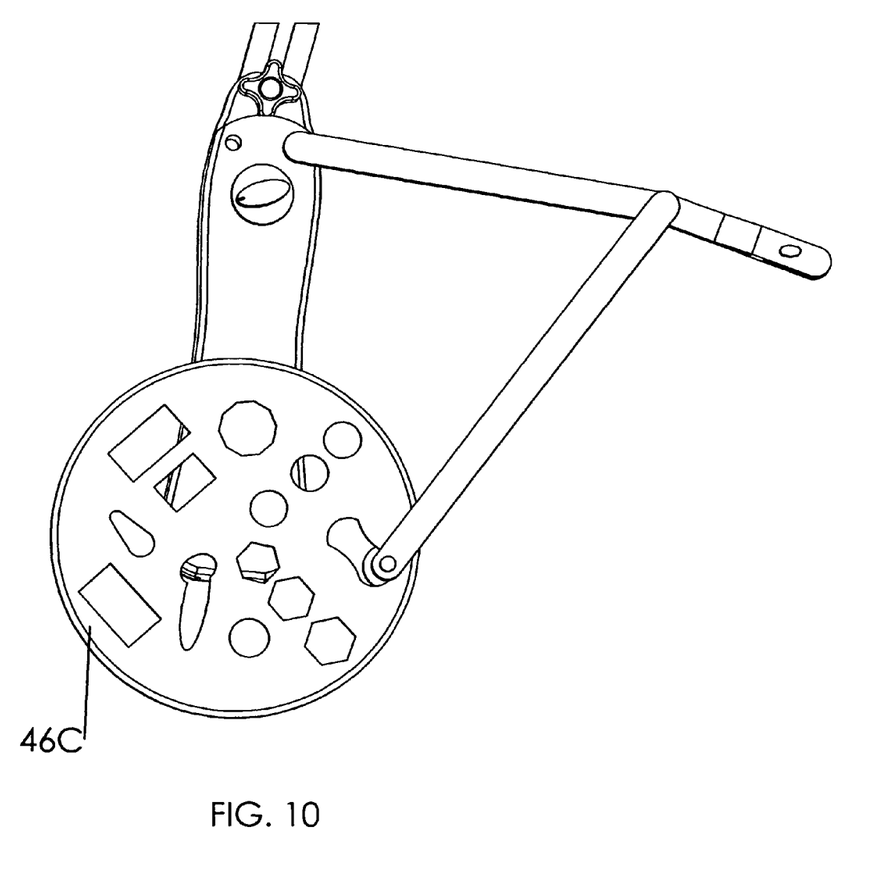
FIG. 10 shows one embodiment of the jigging motion wheel in side view.

Additional embodiments of the jigging motion wheel 46A are shown in FIG. 9 and FIG. 10. FIG. 9 and FIG. 10 show jigging motion wheels 46B and 46C with different cutouts of various geometric shapes and sizes. The geometric shape, size, and texture of the cutouts may be designed and provided in a multitude of ways.

Operation

The automatic jigging device provides mechanical motion to the fishing line 36 to effect life-like motion to a fishing lure thus increasing the likelihood of a fish to strike the fishing lure. The jigging motion wheel 46A is mechanically rotated by the motor 58. As the jigging motion wheel 46A is rotating, the support arm 48 is moved in a unique manner that is determined by the geometric shape of the cutout the fulcrum 66 is placed into by the operator. The unique motion is translated to the fishing line 36 through the clamp 68 at the end of the jigging arm 50. The automatic jigging device provides multiple, life-like, irregular jigging motions, thereby increasing the likelihood that a fish will strike the lure over other devices that impart only a one-dimensional movement to the fishing lure.

Referencing FIG. 1, the automatic jigging device is attached to a wall or stationary base utilizing screws 22 A, B, C, D and the plate 24. The rattle reel may be positioned in any X, Y, or Z direction from the stationary base by rotating the rattle reel arm 32 about the ball joint 26. When the desired position is achieved, the rattle reel 34 may be locked into position by tightening the bolt 28 by turning knob 30. It should be noted that the way the automatic jigging device is attached to the wall or stationary base may be designed and provided in a multitude of ways. Being able to attach the automatic jigging device to the wall or stationary base provides for a more robust and stable design over other automatic jigging devices.

The position of the foundation arm 40, support arm 48, and jigging motion wheel 46A, may be adjusted in a multitude of ways. The foundation arm 40 may be moved along the rattle reel track 38 to position the jigging motion wheel 46A in any position along the X-axis and the foundation arm 40 may be rotated about the pivot joint 42 in the theta direction. The position may be locked into place at pivot joint 42 through a clamping or tightening mechanism. The housing 44, jigging arm 50, support arm 48, and the jigging motion wheel 46A may be moved along the foundation arm track 54 to position the jigging motion wheel 46A in any position along the Y-axis. The housing 44 and the jigging motion wheel 46A may be rotated about the axis joint 52 in the theta direction. The position may be locked into place at axis joint 52 through a clamping or tightening mechanism.

As shown in FIG. 3, the foundation arm 40 and the housing 44 and jigging motion wheel 46A may be positioned and locked parallel to the rattle reel arm 32 to collapse the automatic jigging device for storage or transportation.

The automatic jigging device has multiple ways to position the fishing line 36, the clamp 68, and the jigging motion wheel 46A. This results in a more flexible automatic jigging device that can accommodate various space constraints.

Again referencing FIG. 1, the rattle reel 34 holds the spool of fishing line 36 and rotates about its center axis. When a fish takes the lure and pulls the fishing line 36 the rattle reel 34 will rotate and release additional fishing line 36. As the rattle reel 34 rotates, the beads or bells contained within the rattle reel 34 will make noise and alert the operator that a fish has taken the lure. The automatic jigging device may be engaged or the operator can choose to not use the clamp 68 and the jigging motion wheel 46A and use the rattle reel 34 in its normal operation with no automatic jigging motion. This provides a more flexible device than other automatic jigging devices.

To engage the automatic jigging device, the fulcrum 66 is inserted into a cutout of the jigging motion wheel 46A with the desired geometric shape, size, and texture (FIGS. 1, 2, and 7). When an alternative jigging motion is desired, the fulcrum 66 may be removed from its current cutout and placed into a different cutout. The fishing line 36 is placed into the clamp 68 and the clamp screw 72 is tightened to control the pressure utilized to clasp the fishing line 36 (FIGS. 1, 2, and 5). The power is turned on and the power source 56 powers the motor 58 which mechanically rotates the jigging motion wheel 46A. The speed of the motor 58 is controlled by the switch 60 which is controlled using dial 62. The switch 60 controls the amperage to the motor 58 which controls the speed at which the jigging motion wheel 46A rotates mechanically (FIG. 6). The electronic components and configuration may be designed and provided in a multitude of ways that maintain a similar function. Utilizing a power source means that the automatic jigging device is operable even when there is no wind and it is operable indoors.

As the jigging motion wheel 46A rotates, the fulcrum 66 moves along the geometric shape, size, and texture of the cutout. The movement of the fulcrum 66 transfers to the support arm 48 which moves the jigging arm 50 in a like movement. The jigging arm 50 movement is transferred to the fishing line 36 through the clamp 68 (FIGS. 1 and 2). Throughout the fishing experience, the type of movement of the fishing line 36 may be changed by inserting the fulcrum 66 into a cutout with a different geometric size, shape, and texture.

When a fish strikes and takes the lure, the force that is applied to the fishing line 36 by the fish will cause the fishing line 36 to be released from the clamp 68. The microswitch 70 will shut off the power source 56 to the motor 58 which will cause the jigging motion wheel 46A to stop rotating. Once the fishing line 36 is free from the clamp 68, the rattle reel 34 will rotate about its center axis and release additional fishing line 36. As the rattle reel 34 rotates, beads or bells contained within the rattle reel 34 will make noise and alert the operator that a fish has taken the lure. The rattle reel 34 is allowed to function as it was designed without interference from the automatic jigging device.

Conclusion, Ramifications, and Scope

Thus the reader will see that at least one embodiment of the automatic jigging device provides multiple, life-like, irregular jigging motions, operates when there is no wind, is robust and not easily damaged, can be manufactured more easily, can be disengaged from the line to allow normal operation of the reel and to not interfere with reeling in a fish, can be mountable to a solid surface, provides a reel that can be positioned in multiple ways to provide flexibility in location of the fishing line from the stationary base, and alerts the user when a fish has struck the lure.

Although the description above contains many specificities, these should not be construed as limiting the scope of the embodiments but as merely providing illustrations of some of several embodiments. For example, the electronic components and configuration may be different and still achieve a similar function, the attachment mechanism to the wall or stationary base may be accomplished in different ways such as using adhesive or a clamp, the geometric shape, size and texture of the cutout shapes may be different, the size of the wheels may be different, and multiple materials may be utilized for the components including wood, metal, plastic, composite, etc.

Thus the scope of the embodiments should be determined by the appended claims and their legal equivalents, rather than by the examples given.

I claim:

1. Fishing apparatus for automatically effecting irregular mechanical jigging motion of a fishing line, said apparatus comprising:
   a. a means for attaching adjustably said apparatus to a support,
   b. a rattle reel arm supporting a rattle reel having a spool of fishing line wrapped around said rattle reel,
   c. a foundation arm attached adjustably to said rattle reel arm,
   d. a housing attached adjustably to said foundation arm, thereby said housing provides a means for mechanically rotating a jigging motion wheel,
   e. said jigging motion wheel having a plurality of cutouts of a multitude of geometric shapes, sizes, and textures,
   f. a jigging arm attached pivotally to said housing at one end,
   g. a support arm attached to said jigging arm at about midpoint of said jigging arm,
   h. a fulcrum attached to said support arm and a clamp attached to said jigging arm,
   i. said fulcrum has two different diameter circles, one larger and one smaller,
   j. said smaller diameter of said fulcrum is inserted into one of said cutouts of said jigging motion wheel
   k. said clamp holds said fishing line and said clamp effects the mechanical motion of said jigging motion wheel, said fulcrum, said support arm, and said jigging arm to said fishing line.

2. An apparatus as claimed in claim 1 wherein the apparatus is collapsible.

3. An apparatus as claimed in claim 1 wherein said clamp has a means for controlling the pressure utilized to clasp said fishing line, thereby the pressure may be set to release said fishing line from said clamp by the force that is applied to said fishing line by a fish.

4. An apparatus as claimed in claim 1 wherein said housing has a power source.

5. An apparatus as claimed in claim 4 wherein said clamp contains the means for shutting off said power source when said clamp has released said fishing line.

6. An apparatus as claimed in claim 1 wherein the apparatus may be disengaged from said fishing line to allow normal operation of said rattle reel.

7. A method of imparting irregular jigging motion to a fishing line, comprising:
   a. providing a rattle reel arm having a means to attach to a stationary base and a rattle reel having a spool of fishing line wrapped around said rattle reel,
   b. providing a foundation arm attached adjustably to said rattle reel arm,
   c. providing a housing attached adjustably to said foundation arm,
   d. providing a jigging arm attached pivotally to said housing,
   e. providing a jigging motion wheel attached to said housing,
   f. providing a means to mechanically rotate said jigging motion wheel
   g. providing said jigging motion wheel having a plurality of cutouts of a multitude of geometric shapes, sizes, and textures,
   h. providing a support arm attached to said jigging arm at about midpoint of said jigging arm,
   i. providing a fulcrum attached to the end of said support arm,
   j. providing a clamp attached to said jigging arm,
   k. inserting said fulcrum into said cutout,
   l. inserting said fishing line into said clamp,
   m. mechanically rotating said jigging motion wheel thereby said fulcrum moves along the geometric shape, size, and texture of said cutout, wherein said fulcrum moves said support arm in a like movement, and the movement from said support arm is translated to said fishing line through said jigging arm and said clamp.

* * * * *